United States Patent [19]

Lew

[11] Patent Number: 5,033,313
[45] Date of Patent: Jul. 23, 1991

[54] INERTIA FORCE FLOWMETER

[76] Inventor: Hyok S. Lew, 7890 Oak St., Arvada, Colo. 80005

[21] Appl. No.: 477,488

[22] Filed: Feb. 9, 1990

[51] Int. Cl.$^5$ .............................................. G01F 1/28
[52] U.S. Cl. .................................................. 73/861.72
[58] Field of Search .......... 73/861.42, 861.52, 861.71, 73/861.72, 861.69

[56] References Cited

U.S. PATENT DOCUMENTS 2,897,672  8/1959  Glasbrenner et al. ............ 73/861.72
4,856,347  8/1989  Johnson ............................ 73/861.72

Primary Examiner—Herbert Goldstein

[57] ABSTRACT

An inertia force flowmeter comprises at least one protruding conduit disposed on a curved plane in a cantilever-like arrangement, that experiences inertia force of media moving therethrough that is proportional to the mass flow rate of the media times the velocity of the media, which inertia force is measured by a force or displacement sensor connected to an over-hanging extremity of the protruding conduit, wherein the inertia force of the media moving through the protruding conduit is determined from the force or displacement measured by the force or displacement sensor by using an empirically established mathematical relationship.

19 Claims, 3 Drawing Sheets

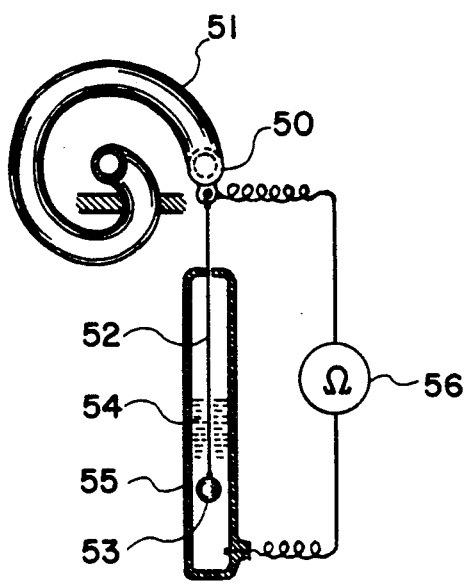
Fig. 11
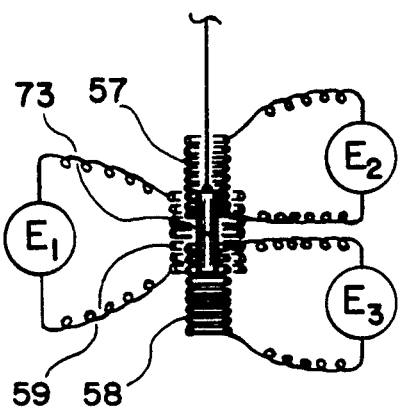
Fig. 12
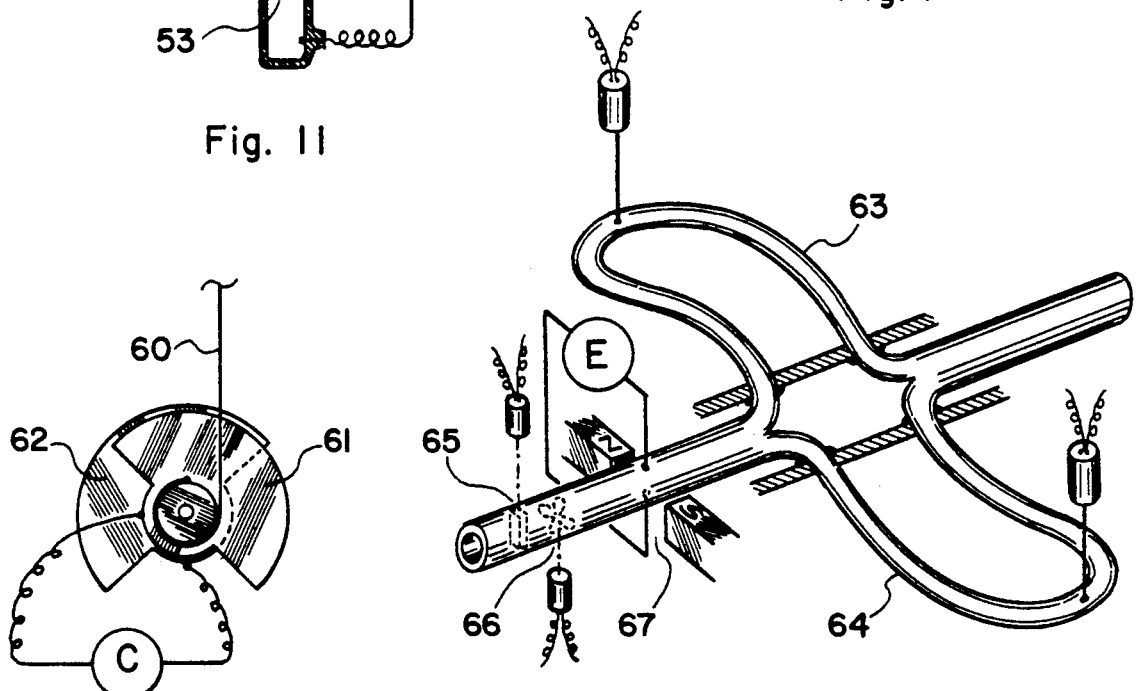
Fig. 13
Fig. 14
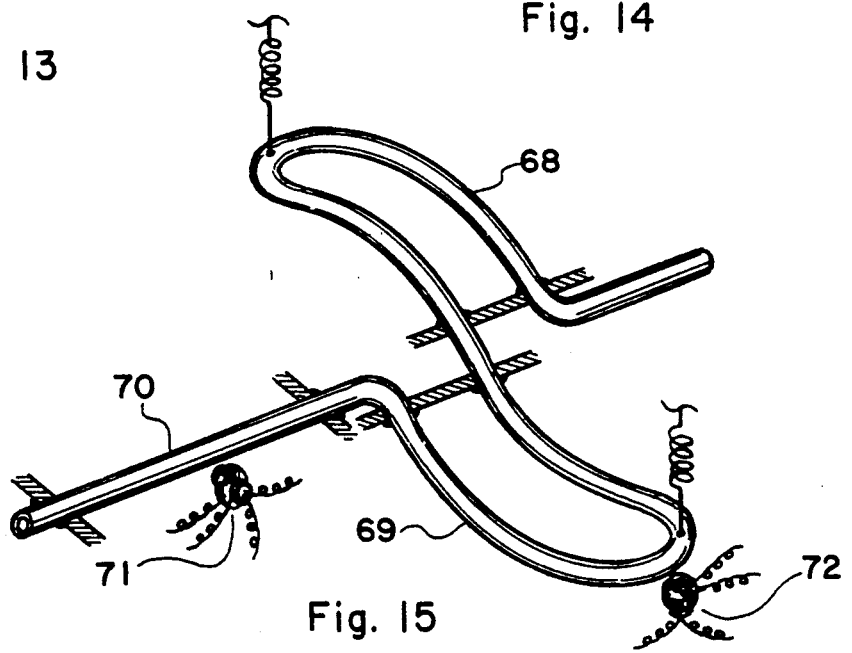
Fig. 15

INERTIA FORCE FLOWMETER

BACKGROUND OF THE INVENTION

The media moving through a curved conduit exerts a fluid dynamic inertia force such as the centrifugal force onto the conduit, wherein the magnitude of the fluid dynamic inertia force is proportional to the mass flow rate of the media times the velocity of the media divided by the radius of the curvature of the conduit. As a consequence, the flow rate of media moving through a curved conduit can be determined by measuring the stress or strain experienced by the curved conduit. In general, the stress or strain experienced by a curved conduit is caused by three different loadings exerted on the curved conduit, which are the pressure of the fluid, the weight of the fluid and the fluid dynamic inertia force. The first two of the three loadings creating a stress or strain on the curved conduit are clearly sensible when a curved elongated balloon is filled with water under pressure; wherein the water pressure tends to straighten the curved elongated balloon, while the weight of the water tends to bend it. The effect of the fluid dynamic inertia force can be easily observed from the reaction of the free end of a garden hose, that tends to straighten itself. In order to measure the flow rate of media moving through a curved conduit, the portion of the stress or strain on the curved conduit exerted by the fluid dynamic inertia force has to be isolated from that caused by the media pressure or weight of the media.

BRIEF SUMMARY OF THE INVENTION

The primary object of the present invention is to provide a flowmeter comprising a protruding conduit disposed on a curved plane, which protruding conduit includes a pair of curved sections respectively connected to an inlet and outlet leg of the conduit and anchored to a rigid support at first extremities, and connected to one another at second extremities; wherein the flow rate of media moving through the conduit is determined from the stress or strain experienced by the conduit as a result of the fluid dynamic inertia force of the media.

Another object is to provide a flowmeter comprising a protruding conduit disposed on a curved plane in a cantilever-like arrangement; wherein the stress or strain on the conduit resulting from the fluid dynamic inertia force is obtained by substracting the stress or strain caused by the media pressure and the weight of the media from the total value of the stress or strain, and the inertia force of media is determined from the stress or strain resulting from the fluid dynamic inertia force so determined.

A further object is to provide a flowmeter comprising two identical protruding conduits respectively disposed on two curved planes in cantilever-like arrangements in a mirror image to one another about a plane of symmetry intermediate the two curved planes, wherein the media moves through only one of the two protruding conduits, while both of the protruding conduits contain essentially the same media pressure; wherein the flow rate of the media is determined from the difference in the stresses or strains experienced by the two protruding conduits.

Yet another object is to provide a flowmeter comprising a pair of combinations of a through and blocked protruding conduits respectively disposed on two curved planes in cantilever-like arrangements in a mirror image to one another about a plane of symmetry intermediate the two curved planes, wherein the pair of combinations of the through and blocked protruding conduits containing essentially the same media pressure are disposed in an axisymmetric arrangement about an axis disposed on the plane of symmetry intermediate the two curved planes; wherein the inertia force of media moving through the through protruding conduits is determined from the difference in the stresses or strains experienced by the two combinations of the through and blocked protruding conduits.

Yet a further object is to provide a combination of the flowmeter comprising at least one through protruding conduit disposed on a curved plane and another flowmeter measuring the velocity of the media, wherein the mass flow rate and/or density of the media is determined from a combination of two measurements respectively provided by the two flowmeters.

Still another object is to provide a combination of the flowmeter comprising at least one through protruding conduit disposed on a curved plane and an apparatus measuring the density of media, wherein the volume and/or mass flow rate of the media is determined from combination of two measurements respectively provided by the flowmeter and the density measuring apparatus.

Still a further object is to provide a combination of the flowmeter comprising at least one through protruding conduit disposed on a curved plane and another flowmeter measuring the mass flow rate of the media, wherein the fluid velocity and/or the density of media is determined from a combination of two measurements respectively provided by the two flowmeters.

These and other objects of the present invention will become clear as the description thereof progresses.

BRIEF DESCRIPTION OF THE FIGURES

The present invention may be described with a greater clarity and specificity by referring the following figures:

FIG. 11 illustrates an embodiment of the potentiometer measuring deflection of a protruding conduit disposed on a curved plane.

FIG. 12 illustrates an embodiment of the inductive displacement sensor that can be employed in place of the potentiometer shown in FIG. 11.

FIG. 13 illustrates an embodiment of the capacitive displacement sensor that can be used in place of the potentiometer shown in FIG. 11.

FIG. 14 illustrates a combination of the inertia force flowmeter of the present invention and another flowmeter measuring volume or mass flow rate, which combination provides mass and volume flow rates as well as the density of media.

FIG. 15 illustrates a combination of the inertia force flowmeter of the present invention and a density meter, which combination provides mass and volume flow rates as well as the density of media.

DESCRIPTION OF THE ILLUSTRATED EMBODIMENTS

Figure 1:
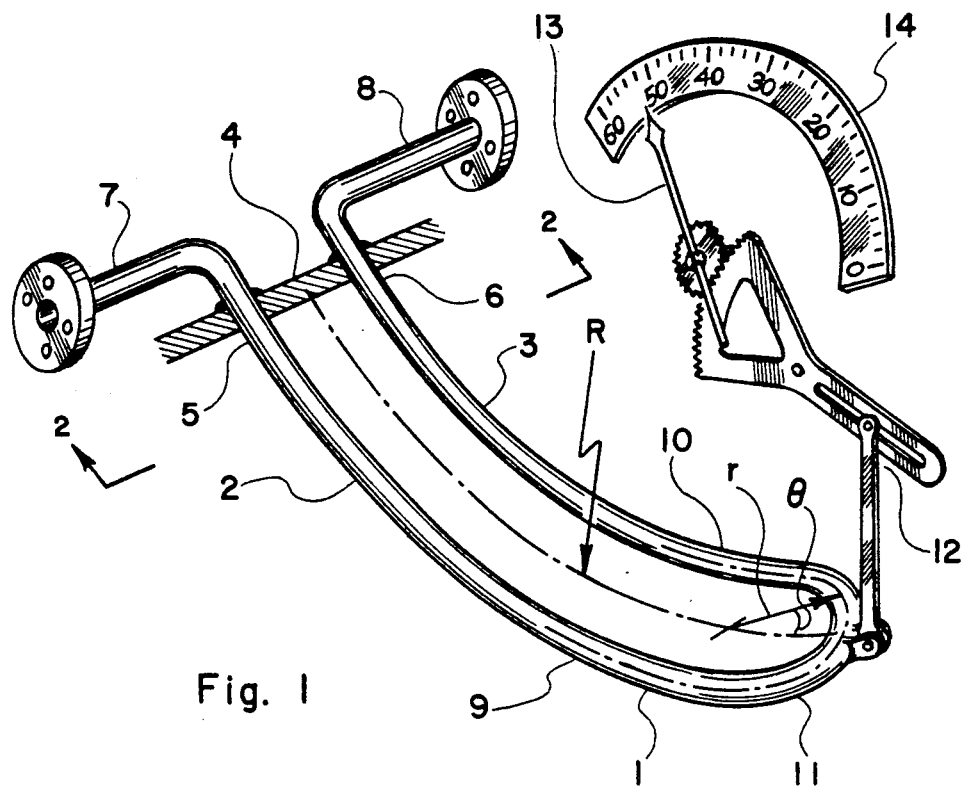
FIG. 1 illustrates a perspective view of an embodiment of the inertia force flowmeter comprising a single through protruding conduit disposed on a curved plane in a cantilever-like arrangement.

In FIG. 1 there is illustrated an embodiment of the inertia force flowmeter of the present invention, that comprises a protruding conduit 1 including a pair of curved sections 2 and 3, which are secured to a rigid support 4 at first extremities 5 and 6 and respectively connected to an inlet and outlet legs 7 and 8, and connected to one another at second extremities 9 and 10 by a looped midsection 11, wherein the protruding conduit 1 is disposed on a curved plane with a radius of curvature R that may be a constant or varies along the distance between the first and second extremities of the protruding conduit 1. The looped midsection 11 has a radius of curvature r that may be a constant or variable. The over-hanging extremity of the protruding conduit 1 includes means for measuring the fluid dynamic inertia force created by the media moving through the protruding conduit 1 and experienced by the protruding conduit 1, which fluid dynamic inertia force is proportional to the mass flow rate times the velocity of media divided by the radius of curvature R. In the particular illustrative embodiment shown in FIG. 1, the means for measuring the magnitude of the fluid dynamic inertia force comprises a displacement sensor comprising the linking mechanism 12 that converts the deflection of the protruding conduit 1 in directions perpendicular to the curved plane including the protruding conduit 1 to the movement of the needle pointer 13 indicating the read-out scales 14. It should be understood that the fluid dynamic inertia force of the media moving through the protruding conduit 1 can be measured by other types of displacement sensor such as those shown in FIGS. 11, 12 and 13, or by a stress or force sensor as shown in FIGS. 6, 7, 8 and 9, which force sensor may operates on mechanical or electronic principles.

Figure 2:
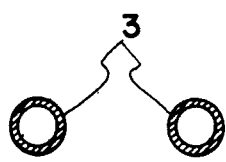
FIG. 2 illustrates a cross section of the protruding conduit employed in the embodiment shown in FIG. 1.

In FIG. 2 there is illustrated a cross section of the protruding conduit 1 taken along plane 2—2 as shown in FIG. 1, wherein the protruding conduit 1 is a tubing with a sizable stiffness having a circular cross section.

Figure 3:
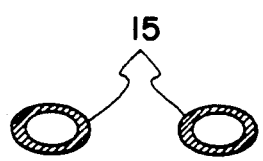
FIG. 3 illustrates a cross section of another protruding conduit that can be employed in the construction of an inertia force flowmeter.

In FIG. 3 there is illustrated a cross section of another protruding conduit 15 equivalent to that shown in FIG. 2, which conduit with an oval or elliptical cross section may be employed as the protruding conduit 1 shown in FIG. 1 in constructing an inertia force flowmeter.

Figure 4:
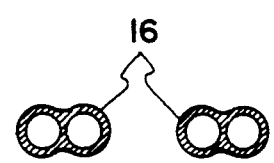
FIG. 4 illustrates a cross section of a further protruding conduit which may be employed in the construction of an inertia force flowmeter.

In FIG. 4 there is illustrated a cross section of a further protruding conduit 16 equivalent to that shown in FIG. 2, which conduit with a cross section of a flattened geometry includes a multiple flow passages disposed in a parallel arrangement.

Figure 5:
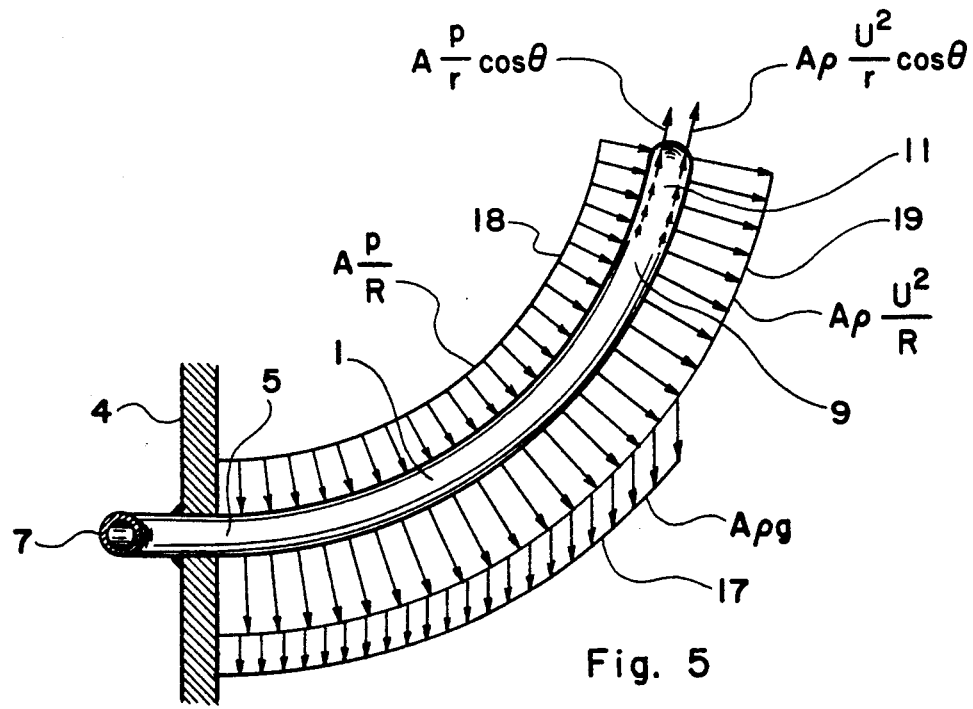
FIG. 5 illustrates distributions of loads on the protruding conduit employed in the construction of an inertia force flowmeter, which originate from the media contained in the conduit and create stress or strain on the protruding conduit.

In FIG. 5 there is illustrated a side view of the protruding conduit seen through a plane parallel to the plane of symmetry of the protruding conduit 1, which illustrates the distribution of loads creating stress or strain on the protruding conduit 1. The protruding conduit 1 experiences a stress or strain created by its own weight, which can be easily eliminated out of attention or relevance by setting the scale of stress or strain equal to zero when there is no media contained in the protruding conduit 1. There are three different loadings created by media contained in the protruding conduit 1, which cause stress or strain on the protruding conduit 1. The most obvious one of the three loadings is the weight of the media contained in the protruding conduit 1 that exerts a loading 17 per unit length of the conduit equal to $A\rho g$, where A is the cross section area of the flow passage included in the protruding conduit 1, $\rho$ is the density of the media contained in the protruding conduit 1, and g is the earth's gravitational acceleration. The second of the three loadings is the media pressure that tends to straighten the curved conduit, which principle is employed in the pressure gauge employing a bourdon tube. The magnitude of the pressure loading 18 per unit length of the protruding conduit 1 is equal to $AP/R$, where P is the media pressure. The last of the three loadings is the fluid dynamic inertia force, that exerts a loading 19 per unit length equal to $A\rho U^2 R$, where U is the velocity of the media moving through the protruding conduit 1.

In order to determine the flow rate of the media from the stress or strain created by the inertia force of the media moving through the protruding conduit 1 and experienced by the protruding conduit 1, the portion of stress or strain created by the fluid dynamic inertia force has to be isolated from the total stress or strain caused by all of the three loadings, i.e., media weight, media pressure and the inertia force of the media. If the media is a gas, the loading by the media weight is usually negligibly small and, consequently, can be ignored without introducing any significant errors in the measurement of the flow rate. If the media is a incompressible liquid, the loading by the media weight is a constant and it can be eliminated out of attention or relevance just like the loading by the weight of the protruding conduit by setting the zero value of the stress or strain so that the stress or strain caused by the weight of the conduit and the media is excluded from the read-out. If the media density is a variable, the strain or stress caused by the media weight can be eliminated out of attention or relevance by disposing the protruding conduit 1 at a position with a special angle with respective to the vertical direction, wherein the weight of the media creates zero net stress or strain to a sensor connected to the over-hanging extremity of the protruding conduit 1. In the particular embodiment shown in FIG. 5, the loading by the media weight tends to increase the curvature of the protruding conduit 1. In other embodiment wherein the protruding conduit is disposed in a position resulting from a 180 degree rotation of the protruding conduit 1 about an axis disposed on the curved plane including the protruding conduit 1 and passing through the anchored extremities thereof, the loading by the media weight tends to increase the curvature of the protruding conduit 1. Therefore, there will be a special position of the protruding conduit 1 intermediate the position shown in FIG. 5 and another position that is the 180 degree rotation thereof, whereat the media weight does not register a nonzero net value of stress or strain on a sensor connected to the over-hanging extremity of the protruding conduit 1. While the effect of the loading by the weight of the media contained in the protruding conduit 1 can be nullified, the stress or strain on the protruding conduit 1 resulting from the pressure loading can not be physically separated from that resulting from the loading by the inertia force of the media moving through the protruding conduit 1. One method for isolating the stress or strain on the protruding conduit 1 created by the inertia force of the media moving therethrough from that caused by the pressure loading is to empirically determine the mathematical relationship between the medium pressure and the stress or strain on the protruding conduit 1 caused by the media pressure only. When the media pressure is measured by a pressure sensor and the stress or strain caused by the measured media pressure, which is determined from the empirically established mathematical relationship as a function of the measured pressure, is substracted from the total value of the stress or strain, the net stress or strain on the protruding conduit 1 caused exclusively by the inertia force of the media moving therethrough is determined, and the inertia force $A\rho U^2$ can be determined from the net stress or strain created by the inertia force of the media by using an empirically established relationship. In general, the above-mentioned procedure for determining the magnitude of the inertia force $A\rho U^2$ is less than practical, because it requires the measurement of the media pressure and the data processor that executes an elaborate mathematical calculations.

Figure 6:
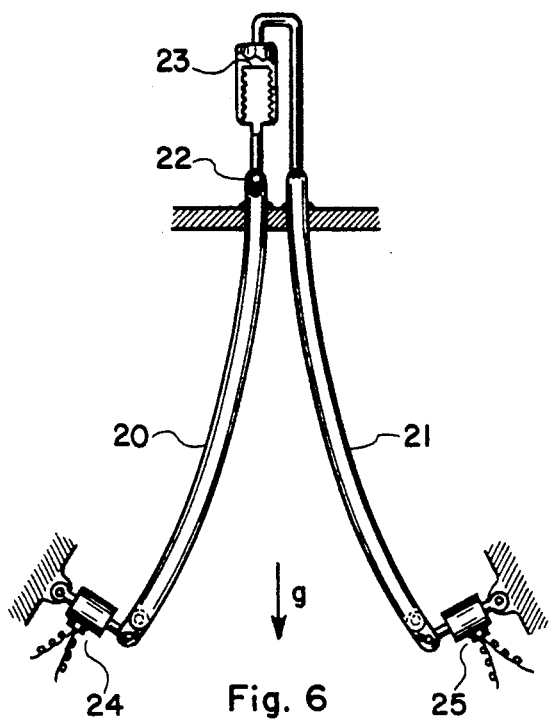
FIG. 6 illustrates an embodiment of the inertia force flowmeter employing a through and blocked protruding conduits respectively disposed on two curved planes in a mirror image to one another about a plane of symmetry intermediate the two curved planes.

In FIG. 6 there is illustrated an embodiment of the inertia force flowmeter comprising a pair of identical protruding conduits 20 and 21, which are disposed in a mirror image to one another across a flat plane therebetween, wherein each of the two protruding conduits 20 and 21 has the same construction and arrangement as that of the protruding conduit 1 shown in FIG. 1 and 5. The first protruding conduit 20 has a through flow passage connecting the inlet leg 22 to the outlet leg of the flowmeter, while the second protruding conduit 21 has a blockage that prevents the media from moving therethrough and is connected to the inlet and/or outlet leg of the flowmeter directly or through an expandable partition such as a bellow 23, whereby the two protruding conduits 20 and 21 contain the same media pressure. When the two protruding conduits 20 and 21 are disposed in positions wherein the weight of the media contained therein does not create a net stress or strain thereon at the over-hanging extremities thereof as mentioned in conjunction with FIG. 5, the only difference in the loadings between the two protruding conduits 20 and 21 is the loading by the inertia force of media moving through the first protruding conduit 20 and experienced thereby, since the pressure loadings are the same for the two protruding conduits 20 and 21 and the loading by the inertia force is absent in the second protruding conduit 21 as there is no media movement therethrough. Therefore, the difference between the tension or compression values respectively registered by the two force sensors 24 and 25 respectively connected to the extremities of the two protruding conduits 20 and 21 provides a measure of the inertia force $A\rho U^2$ of the media moving through the first protruding conduit 20. The magnitude of the inertia force of the media is determined from difference between the two measured values of the force by using an empirically established mathematical relationship therebetween. Once the fluid density or the velocity U is known or measured by another apparatus, the mass and/or volume flow rates and/or the density of the media can be determined from the inertia force $A\rho U^2$ measured by the inertia force flowmeter of the present invention. In place of the pair of force sensors 24 or 25, a pair of displacement sensors can be employed; wherein the inertia force is determined as a function of the difference in displacement instead of the difference in force experienced at the over-hanging extremities of the two protruding conduits 20 and 21.

Figure 7:
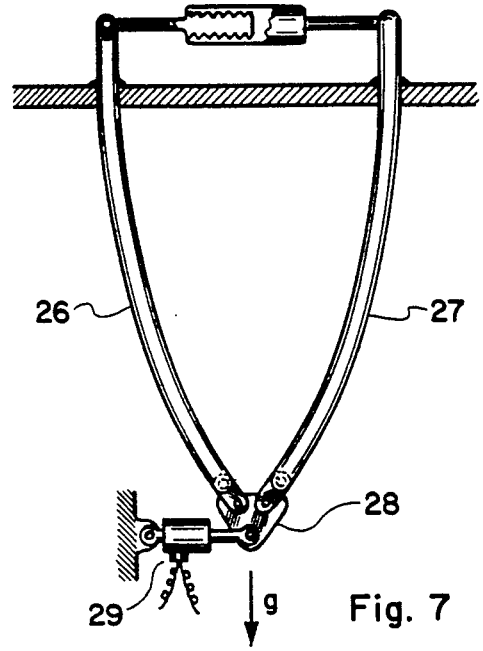
FIG. 7 illustrates another embodiment of the inertia force flowmeter employing a through and blocked protruding conduits respectively disposed on two curved planes in a mirror image to one another.

In FIG. 7 there is illustrated another embodiment of the inertia force flowmeter comprising a pair of identical protruding conduits 26 and 27 disposed in a mirror image to one another, which combination have the same construction and arrangement as the pair of protruding conduits 20 and 21 shown in FIG. 6 with one exception being that the over-hanging extremities of the curved protruding conduits 26 and 27 now converge towards one another and are coupled to one another by a simple mechanical connector 28. A force sensor 29 connected to the simple mechanical connector 28 measures the force created by the inertia force of the media moving through the protruding conduit section 26, from which the inertia force $A\rho U^2$ is determined by using an empirically established relationship. In place of the force sensor 29, a displacement sensor can be employed, wherein the inertia force $A\rho U^2$ is determined as a function of the displacement registered by the displacement sensor.

Figure 8:
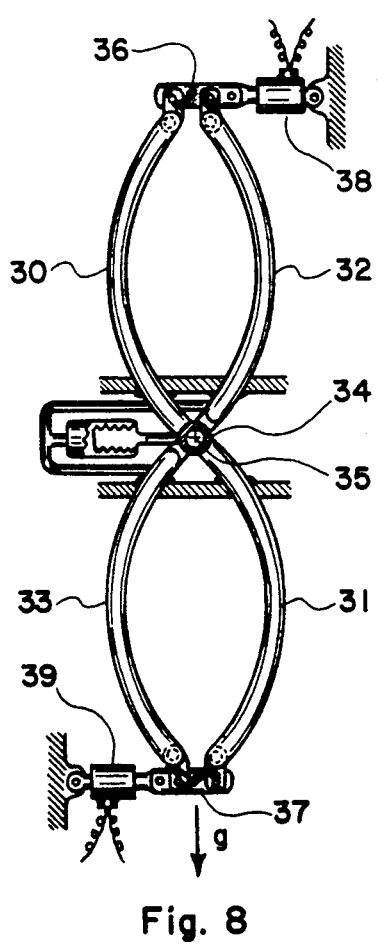
FIG. 8 illustrates an embodiment of the inertia force flowmeter comprising a pair of combinations of a through and blocked protruding conduits respectively disposed on two curved planes in a mirror image to one another about a plane of symmetry intermediate the two curved planes, wherein the pair of the combinations are disposed in an axisymmetric arrangement about an axis parallel to the plane of symmetry.

In FIG. 8 there is illustrated an embodiment of the inertia force flowmeter comprising a pair of through protruding conduits 30 and 31, and a pair of blocked protruding conduits 32 and 33, each of which protruding conduits has the same construction and arrangement as that of the protruding conduit 1 shown in FIG. 1. The through protruding conduits 30 and 31 connects the inlet leg 34 to the outlet leg of the flowmeter in a parallel connection. The through protruding conduit 30 and the blocked protruding conduit 32 are disposed in a mirror image to one another across a plane of symmetry therebetween, and so is the arrangement between the through protruding conduit 31 and the block protruding conduit 33. The combination of the protruding conduits 30 and 32, and the combination of the protruding conduits 31 and 33 are disposed in a axisymmetric arrangement about an axis 35 disposed on the plane of symmetry. The over-hanging extremities of the through protruding and blocked protruding conduit included in each of the pair of combinations are coupled to one another by a simple mechanical connector 36 or 37, which is connected to a force sensor 38 or 39. As the four protruding conduits 30, 31, 32 and 33 have identical construction and stiffness, the loadings by the weight of the media contained in the protruding conduits are cancelled between the through protruding conduits 30 and 31 and also between the blocked protruding conduits 32 and 33. The loadings by the media pressure are cancelled between the through protruding conduit 30 and the blocked protruding conduit 32, and also between the through protruding conduit 31 and the blocked protruding conduit 33. Therefore, addition of the forces registered by the two force sensors 36 and 37 provides a net force exclusively created by the inertia force of the media moving through the protruding conduits 30 and 31, and consequently, the inertia force $A\rho U^2$ of the media can be determined from the addition of the forces registered by the two force sensors 36 and 37 by using an empirically established relationship. It should be understood that the force sensors 38 and 39 may be replaced by a pair of displacement sensors.

Figure 9:
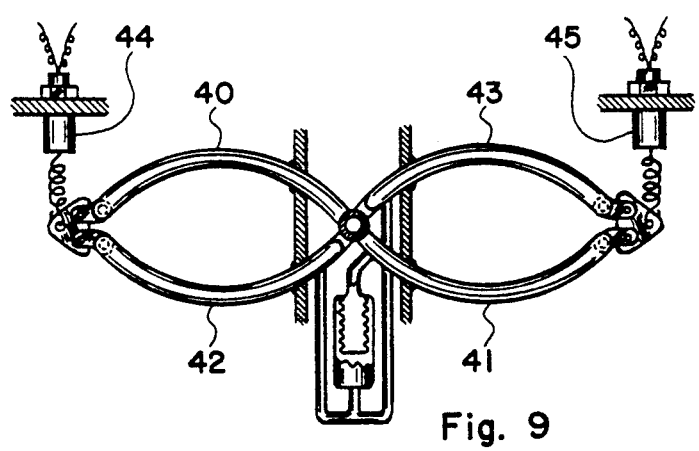
FIG. 9 illustrates another embodiment of the inertia force flowmeter having the same construction as the embodiment shown in FIG. 8, that has a 90 degrees rotated arrangement about the axis of axisymmetry.

In FIG. 9 there is illustrated another embodiment of the inertia force flowmeter comprising a pair of through protruding conduits 40 and 41 and a pair of blocked protruding conduits 42 and 43, which protruding conduits having the same construction and arrangement as that of the protruding conduits 30, 31, 32 and 33 shown in FIG. 8 are disposed in a 90 degree rotated position from the combination shown in FIG. 8. In this particular embodiment, the inertia forces of the media $A\rho U^2$ is determined from the difference in the forces registered by the two force sensors 44 and 45 by using an empirically established relationship. The pair of the force sensors 44 and 45 may be replaced by a pair of displacement sensors. It should be understood that, although the arrangements illustrated in FIGS. 8 and 9 show the most desirable position, the combination of the four protruding conduits can be disposed in any position relative to the direction of the earth's gravitational acceleration.

Figure 10:
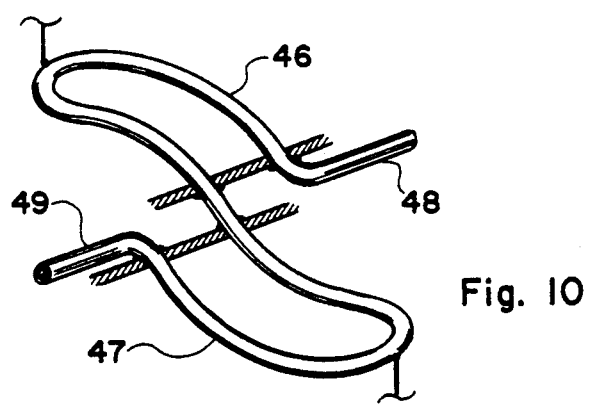
FIG. 10 illustrates a pair of through looped protruding conduits arranged in series and respectively disposed on two curved planes in an axisymmetric arrangement about an axis parallel to the two curved planes.

In FIG. 10 there is illustrated a perspective view of a pair of through protruding conduits 46 and 47 disposed in a series connection, which combination connects the inlet leg 48 to the outlet leg 49 of the flowmeter. By adding a pair of blocked protruding conduits to the pair of through protruding conduits 46 and 47 in an arrangement similar to the embodiment shown in FIG. 8 or 9, one can obstruct an inertia force flowmeter comprising a single continuous flow passage instead of a bifurcating and merging flow passage.

In FIG. 11 there is illustrated an embodiment of the ohmic potentiometer type displacement sensor, that measures the displacement of the over-hanging extremity 50 of a protruding conduit 51 which may be employed in the construction of the inertia force flowmeter shown in FIGS. 1, 6, 7, 8, 9 and 10. This displacement sensor includes an elongated member 52 of a high specific ohmic resistance, that depends from the over-hanging extremity 50 of the protruding conduit 51 and supports a weight 53 immersed in a conducting fluid 54 contained in an elongated container 55. The ohmic resistance 56 between two terminals respectively connected to the anchored extremity of the elongated member 52 and the conducting fluid 55 provides a measure of the position of the extremity 50 of the protruding conduit 51. The potentiometer shown in the particular illustrative embodiment or other conventional potentiometers may be employed in place of the force sensors included in the embodiments shown in FIGS. 6-9, whereby the inertia force of the media $A\rho U^2$ is determined from the displacement of the over-hanging extremities of the protruding conduits by using an empirically established relationship.

In FIG. 12 there is illustrated an embodiment of the reluctive or inductive position sensor, that comprises a ferromagnetic core 56 depending from the over-hanging extremity of a protruding conduits, which engages a pair of output coils 57 and 58 respectively disposed adjacent to the two extremities of an input coil 59 energized by an alternating electromotive force $E_1$. The output electromotive force ratio $E_2/E_3$ provides a measure of position of the ferromagnetic core 56 relative to the half-way section between the two output coils 57 and 58. This type of reluctive or inductive position sensor may be employed in place of the force sensors employed in the construction of the inertia force flowmeters shown in FIGS. 6-9.

In FIG. 13 there is illustrated an embodiment of the capacitive position sensor including a cord 60 depending from the over-hanging extremity of a protruding conduit that rotates rotor plate 61 of the variable area capacitor relative to the stator plate 62. The capacitance of the variable are capacitor provides a measure of the position of the over-hanging extremity of the protruding conduit, from which the cord 60 depends. The force sensors included in the embodiments shown in FIGS. 6-9 may be replaced by capacitive position sensor shown in the particular illustrative embodiment or other type.

In FIG. 14 there is illustrated a combination of the inertia force flowmeter of the present invention represented by the pair of through portruding conduits 63 and 64 (the pair of blocked protruding conduits are not shown for the brevity of the illustration) and a volume flowmeter such as a vortex shedding flowmeter 65 or a turbine flowmeter 66 of a magnetic flowmeter 67. As the inertia force flowmeter measures the inertia force $A\rho U^2$ and the volume flowmeter measures the fluid velocity U, the mass flow rate $A\rho U$ and the fluid density $\rho$ can be determined by combining the two measurements respectively provided by the two flowmeters.

In FIG. 15 there is illustrated a combination of the inertia force flowmeter represented by a pair of protruding conduit sections 68 and 69 measuring the inertia force $A\rho U^2$ and a density meter 70 measuring the fluid density $\rho$, which combination provides the mass and volume flow rates $A\rho U$ and $AU$. The density meter 70 determines the fluid density from the natural frequency of the flexural vibration of the conduit section 70, that is induced by an electromagnetic vibrator 71. In place of the density meter 70, one of the two protruding conduits 68 and 69 may be vibrated by an electromagnetic vibrator 72 and the fluid density may be determined from the natural frequency thereof, whereby eliminating the need of a separate density meter 70.

While the principles of the present inventions have now been made clear by the illustrative embodiments, there will be many modifications of the structures, arrangements, proportions, elements and materials obvious to those skilled in the art, which are particularly adapted to the specific working environments and operating conditions in the practice of the invention without departing from those principles. It is not desired to limit the inventions to the particular illustrative embodiments shown and described and, accordingly, all suitable modifications and equivalents may be regarded as falling within the scope of the inventions as defined by the claims which follow.

The embodiments of the invention, in which an exclusive property or privilege is claimed, are defined as follows:

1. An apparatus for measuring flow of media comprising in combination:
   (a) a protruding conduit including a first curved section connected to an inlet leg and extending from an anchored extremity thereof; a second curved section connected to an outlet leg and extending from an anchored extremity thereof; and a curved midsection connecting said first curved section to said second curved section, wherein said protruding conduit is disposed on a curved plane;
   (b) means for detecting inertia force created by media moving through said protruding conduit and experienced by said protruding conduit as a measure of flow of the media through the protruding conduit.

2. The combination as set forth in claim 1 wherein said means for detecting inertia force comprises a force sensor connected to said protruding conduit.

3. The combination as set forth in claim 2 wherein the inertia force of the media moving through the conduit is determined from a portion of force measured by said force sensor, which portion of force is created by the inertia force.

4. The combination as set forth in claim 1 wherein said means for detecting inertia force comprises a displacement sensor connected to said protruding conduit.

5. The combination as set forth in claim 4 wherein the inertia force of the media moving through the conduit is determined from a portion of displacement measured by said displacement sensor, which portion of displacement is created by the inertia force.

6. The combination as set forth in claim 1 wherein the apparatus is combined with a volume flowmeter, wherein mass flow rate of the media is obtained from a combination of the inertia force measured by said apparatus and the velocity of the media measured by said volume flowmeter.

7. The combination as set forth in claim 1 wherein said apparatus is combined with a density meter, wherein mass flow rate of the media is obtained from a combination of the inertial force measured by said apparatus and the density of media measured by said density meter.

8. An apparatus for measuring flow of media comprising in combination:
   (a) a first protruding conduit including a first curved section connected to an inlet leg and extending from an anchored extremity thereof, a second curved section connected to an outlet leg and extending from an anchored extremity thereof; and a curved midsection connecting said first curved section to said second curved section; wherein said first protruding conduit is disposed on a first curved plane;
   (b) a second protruding conduit having a stiffness generally identical to that of said first protruding conduit disposed on a second curved plane in a mirror image of said first protruding conduit across a plane intermediate said first and second curved planes; wherein from moving therethrough and is connected to at least one of said inlet and outlet legs, whereby said first and second protruding conduits contain generally equal media pressure; and
   (c) means for determining inertia force of media moving through said first protruding conduit from difference in stresses experienced by said first and second protruding conduits.

9. The combination as set forth in claim 8 wherein said means for determining inertia force comprises a pair of force sensor respectively connected to said first and second protruding conduits.

10. The combination as set forth in claim 8 wherein said means for determining inertia force comprises a force sensor connected to extremities of said first and second protruding conduits.

11. The combination as set forth in claim 8 wherein said means for determining inertia force comprises a pair of displacement sensors respectively connected to said first and second protruding conduits.

12. The combination as set forth in claim 8 wherein said means for determining inertia force comprises a displacement sensor connected to extremities of said first and second protruding conduits.

13. The combination as set forth in claim 8 wherein said apparatus is combined with a volume flowmeter, wherein mass flow rate of the media is obtained form a combination of the inertia force measured by said apparatus and the velocity of the media measured by said volume flowmeter.

14. The combination as set forth in claim 8 wherein said apparatus is combined with a density meter, wherein mass flow rate of the media is obtained from a combination of the inertia force measured by said apparatus and the density of media measured by said density meter.

15. An apparatus for measuring flow of media comprising in combination:
   (a) a first protruding conduit including a first curved section extending from an anchored extremity thereof; a second curved section extending from an anchored extremity thereof; and a curved midsection connecting said first curved section to said second curved section; wherein said first protruding conduit is disposed on a first curved plane and provides a flow passage for the media;
   (b) a second protruding conduit having a stiffness generally identical to that of said first protruding conduit disposed on a second curved plane in a mirror image of said first protruding conduit across a plane intermediate said first and second curved planes; wherein said second protruding conduit has a blockage preventing the media from moving therethrough and is connected to a flow passage of the media, whereby said first and second protruding conduits contain generally equal media pressure;
   (c) a third protruding conduit having a stiffness generally identical to that of said first protruding conduit disposed on a third curved plane in an axisymmetric arrangement with respect to said first protruding conduit about an axis generally parallel to said plane intermediate said first and second curved planes; wherein said third protruding conduit provides a flow passage for the media;
   (d) a fourth protruding conduit having stiffness generally identical to that of said third protruding conduit disposed on a fourth curved plane in a mirror image of said third protruding conduit across a plane intermediate said third and fourth curved planes; wherein said fourth protruding conduit has a blockage preventing the media from moving therethrough and is connected to a flow passage of the media, whereby said third and fourth protruding conduits contain generally equal media pressure; and (e) means for detecting difference in stresses experienced by said first and second protruding conduits and difference in stresses experienced by said third and fourth protruding conduits;

wherein inertia force of media moving through said first and third protruding conduits is determined from a combination of the difference in stresses experienced by said first and second protruding conduits and the difference in stresses experienced by said third and fourth protruding conduits as a measure of flow of the media.

16. The combination as set forth in claim 15 wherein said means for detecting difference in stresses comprises a first force sensor connected to extremities of said first and second protruding conduits, and a second force sensor connected to extremities of said third and fourth protruding conduits, wherein the inertia force of media is determined from a combination of two forces respectively measured by said first and second force sensors.

17. The combination as set forth in claim 15 wherein said means for determining difference in stresses comprises a first displacement sensor connected to extremities of said first and second protruding conduits, and a second displacement sensor connected to extremities of said third and fourth protruding conduits, wherein the inertia force of media is determined from a combination of two displacements respectively measured by said first and second displacement sensors.

18. The combination as set forth in claim 15 wherein said apparatus is combined with a volume flowmeter, wherein mass flow rate of the media is obtained from a combination of the inertia force measured by said apparatus and the velocity of the media measured by said volume flowmeter.

19. The combination as set forth in claim 15 wherein said apparatus is combined with a density meter, wherein mass flow rate of the media is obtained from a combination of the inertia force measured by said apparatus and the density of media measured by said density meter.

* * * * *